US009983687B1

(12) United States Patent
Forsblom et al.

(10) Patent No.: US 9,983,687 B1
(45) Date of Patent: May 29, 2018

(54) GESTURE-CONTROLLED AUGMENTED REALITY EXPERIENCE USING A MOBILE COMMUNICATIONS DEVICE

(71) Applicant: Adtile Technologies Inc., San Diego, CA (US)

(72) Inventors: Nils Forsblom, San Diego, CA (US); Maximilian Metti, San Diego, CA (US); Angelo Scandaliato, San Diego, CA (US)

(73) Assignee: Adtile Technologies Inc., San Diego, CA (US)

( * ) Notice: Subject to any disclaimer, the term of this patent is extended or adjusted under 35 U.S.C. 154(b) by 0 days. days.

(21) Appl. No.: 15/863,775

(22) Filed: Jan. 5, 2018

Related U.S. Application Data

(60) Provisional application No. 62/443,461, filed on Jan. 6, 2017.

(51) Int. Cl.
| | |
|---|---|
| *G06F 3/01* | (2006.01) |
| *G06F 3/0346* | (2013.01) |
| *G06F 3/16* | (2006.01) |
| G06T 19/00 | (2011.01) |
| H04M 1/725 | (2006.01) |

(52) U.S. Cl.
CPC .............. *G06F 3/017* (2013.01); *G06F 3/011* (2013.01); *G06F 3/0346* (2013.01); *G06F 3/167* (2013.01); *G06F 3/016* (2013.01); *G06T 19/006* (2013.01); *H04M 1/725* (2013.01); *H04M 2250/52* (2013.01)

(58) Field of Classification Search
None
See application file for complete search history.

(56) References Cited

U.S. PATENT DOCUMENTS

| 5,534,917 A | 7/1996 | Macdougall |
|---|---|---|
| 7,058,204 B2 | 6/2006 | Hildreth et al. |
| 7,227,526 B2 | 6/2007 | Hildreth et al. |
| 7,379,566 B2 | 5/2008 | Hildreth |

(Continued)

FOREIGN PATENT DOCUMENTS

WO    WO2002039063    5/2002

OTHER PUBLICATIONS

Olive Media Canada, Infiniti JX Tablet Advertisement by Olive Mobile, video, https://www.youtube.com/watch?v=KGIWebpdmYE#t=79, published May 29, 2012, 2 pages.

(Continued)

*Primary Examiner* — Chad Dicke
(74) *Attorney, Agent, or Firm* — Stetina Brunda Garred & Brucker

(57) ABSTRACT

A method for producing a gesture-controlled augmented reality experience using a first mobile communications device includes receiving a motion sensor input on a motion sensor input modality of the first mobile communications device, calculating a trajectory of a camera of the first mobile communications device in response to the received motion sensor input, receiving a visual input captured by the camera of the first mobile communications device, translating a gesture of a user into a set of quantified values based on the received visual input and the calculated trajectory of the camera, and controlling an augmented reality object within a three-dimensional virtual environment in response to a substantial match between the set of quantified values and a set of predefined values.

20 Claims, 10 Drawing Sheets

(56) References Cited

U.S. PATENT DOCUMENTS

| | | |
|---|---|---|
| 7,389,591 B2 | 6/2008 | Jaiswal et al. |
| 8,631,358 B2 | 1/2014 | Louch |
| 9,299,092 B1 | 3/2016 | Brown et al. |
| 2005/0238201 A1 | 10/2005 | Shamaie |
| 2007/0090180 A1 | 4/2007 | Griffis et al. |
| 2007/0136132 A1 | 6/2007 | Weiser et al. |
| 2008/0147493 A1 | 6/2008 | Aarnio et al. |
| 2009/0029720 A1 | 1/2009 | Jaffe et al. |
| 2009/0157341 A1 | 6/2009 | Cheung |
| 2009/0184849 A1 | 7/2009 | Nasiri et al. |
| 2009/0319166 A1 | 12/2009 | Khosravy et al. |
| 2010/0114562 A1 | 6/2010 | Georgi et al. |
| 2010/0257475 A1 | 10/2010 | Smith et al. |
| 2010/0269030 A1 | 10/2010 | Dugonjic et al. |
| 2011/0173204 A1 | 7/2011 | Murillo et al. |
| 2011/0191024 A1 | 8/2011 | Deluca |
| 2011/0238308 A1 | 9/2011 | Miller et al. |
| 2011/0270679 A1 | 11/2011 | Tziortzis et al. |
| 2011/0288913 A1 | 11/2011 | Waylonis et al. |
| 2012/0036003 A1 | 2/2012 | Tong et al. |
| 2012/0041767 A1 | 2/2012 | Hoffman et al. |
| 2012/0131454 A1 | 5/2012 | Shah |
| 2012/0246596 A1 | 9/2012 | Ording et al. |
| 2012/0265595 A1 | 10/2012 | Corner et al. |
| 2012/0310717 A1 | 12/2012 | Kankainen |
| 2013/0102330 A1 | 4/2013 | Lee |
| 2013/0166397 A1 | 6/2013 | Byun et al. |
| 2013/0166398 A1 | 6/2013 | Byun |
| 2013/0211923 A1 | 8/2013 | Yuill et al. |
| 2013/0211924 A1 | 8/2013 | Yuill et al. |
| 2013/0218680 A1 | 8/2013 | Forsblom |
| 2014/0019254 A1 | 1/2014 | Reichert |
| 2014/0023087 A1 | 1/2014 | Czompo |
| 2014/0278853 A1 | 9/2014 | Brown et al. |
| 2014/0280517 A1 | 9/2014 | White et al. |
| 2014/0282088 A1 | 9/2014 | Kakani et al. |
| 2014/0288873 A1 | 9/2014 | Czompo et al. |
| 2014/0316884 A1 | 10/2014 | Munisamy |
| 2014/0344055 A1 | 11/2014 | Sanghavi et al. |
| 2014/0352400 A1 | 12/2014 | Barrilado et al. |
| 2015/0046247 A1 | 2/2015 | Rajappa |
| 2015/0081448 A1 | 3/2015 | Osotio et al. |
| 2015/0095160 A1 | 4/2015 | Ma |
| 2015/0120458 A1 | 4/2015 | Lee et al. |
| 2015/0135284 A1 | 5/2015 | Bogard |
| 2015/0286279 A1 | 10/2015 | Lim et al. |
| 2016/0292742 A1 | 10/2016 | Kang et al. |

OTHER PUBLICATIONS

Rachel Lamb, Infiniti releases first touch-screen ad for JX, web page, http://www.luxurydaily.com/infinitireleasesfirst-touchscreenadforxj/, Jun. 7, 2012, 4 pages.
Leadbolt, LeadBolt Launches Industry's First and Only Mobile Ad Format to Utilize Gyroscope Technology, web page, http://www.businesswire.com/news/home/20131217005561/en/LeadBolt-Launches-Industry%E2%80%99s-Mobile-Ad-Format-Utilize, Dec. 17, 2013, 2 pages.
Medialets, Medialets Shakes Up Mobile Advertising, web page, https://www.medialets.com/medialetsshakesupmobileadvertising/, Apr. 22, 2009, 3 pages.
Forbes, Shaking Up Advertising, web page, http://www.forbes.com/2009/03/16dockersmobileadvertisingleadershipcmonetworkmobilemarketing.Html, Mar. 16, 2009, 4 pages.
Rebecca Borison, Tic Tac sees 7.94pc engagement rate with richmedia ad, web page, http://www.mobilemarketer.com/cms/news/advertising/16631.html, Nov. 19, 2013, 4 pages.
Medialets, World's First Shakable Ad™ by Medialets, video, https://www.youtube.com/watch?v=NwnuwGhcpRU, uploaded Apr. 11, 2009, 2 pages.
David Talbot, What Apple's M7 Motion-Sensing Chip Could Do, Sep. 25, 2013, 2 Pages.
Chris Brandrick, Apple's M7 Chip Is the Trojan Horse for Its Wearable Computing Plans, Sep. 13, 2013, 7 Pages.
International Search Report and Written Opinion for PCT/US14/69554; dated Mar. 6, 2015; 11 pages.
International Search Report and Written Opinion for International Application No. PCT/US2016/044318; dated Oct. 7, 2016; 12 pages.
Canadian Trademark Registration No. TMA700194; Registered Nov. 6, 2007; Owned by Qualcomm Incorporated.

GESTURE-CONTROLLED AUGMENTED REALITY EXPERIENCE USING A MOBILE COMMUNICATIONS DEVICE

CROSS-REFERENCE TO RELATED APPLICATIONS

The present application relates to and claims the benefit of U.S. Provisional Application No. 62/443,461 filed Jan. 6, 2017 and entitled "AUGMENTED REALITY SCANNED AND CONTROLLED OBJECTS," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to human-computer interfaces and mobile devices, and more particularly, to gesture-controlled interactions with a three-dimensional virtual environment.

2. Related Art

Mobile devices fulfill a variety of roles, from voice communications and text-based communications such as Short Message Service (SMS) and e-mail, to calendaring, task lists, and contact management, as well as typical Internet based functions such as web browsing, social networking, online shopping, and online banking. With the integration of additional hardware components, mobile devices can also be used for photography or taking snapshots, navigation with mapping and Global Positioning System (GPS), cashless payments with NFC (Near Field Communications) point-of-sale terminals, and so forth. Such devices have seen widespread adoption in part due to the convenient accessibility of these functions and more from a single portable device that can always be within the user's reach.

Although mobile devices can take on different form factors with varying dimensions, there are several commonalities between devices that share this designation. These include a general purpose data processor that executes pre-programmed instructions, along with wireless communication modules by which data is transmitted and received. The processor further cooperates with multiple input/output devices, including combination touch input display screens, audio components such as speakers, microphones, and related integrated circuits, GPS modules, and physical buttons/input modalities. More recent devices also include accelerometers and compasses that can sense motion and direction. For portability purposes, all of these components are powered by an on-board battery. In order to accommodate the low power consumption requirements, ARM architecture processors have been favored for mobile devices. Several distance and speed-dependent communication protocols may be implemented, including longer range cellular network modalities such as GSM (Global System for Mobile communications), CDMA, and so forth, high speed local area networking modalities such as WiFi, and close range device-to-device data communication modalities such as Bluetooth.

Management of these hardware components is performed by a mobile operating system, also referenced in the art as a mobile platform. The mobile operating system provides several fundamental software modules and a common input/output interface that can be used by third party applications via application programming interfaces.

User interaction with the mobile device, including the invoking of the functionality of these applications and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces in which users tap, slide, flick, pinch regions of the sensor panel overlaying the displayed graphical elements with one or more fingers, particularly when coupled with corresponding animated display reactions responsive to such actions, may be more intuitive than conventional keyboard and mouse input modalities associated with personal computer systems. Thus, minimal training and instruction is required for the user to operate these devices.

However, mobile devices must have a small footprint for portability reasons. Depending on the manufacturer's specific configuration, the screen may be three to five inches diagonally. One of the inherent usability limitations associated with mobile devices is the reduced screen size; despite improvements in resolution allowing for smaller objects to be rendered clearly, buttons and other functional elements of the interface nevertheless occupy a large area of the screen. Accordingly, notwithstanding the enhanced interactivity possible with multi-touch input gestures, the small display area remains a significant restriction of the mobile device user interface. This limitation is particularly acute in graphic arts applications, where the canvas is effectively restricted to the size of the screen. Although the logical canvas can be extended as much as needed, zooming in and out while attempting to input graphics is cumbersome, even with the larger tablet form factors.

Expanding beyond the confines of the touch interface, some app developers have utilized the integrated accelerometer as an input modality. Some applications such as games are suited for motion-based controls, and typically utilize roll, pitch, and yaw rotations applied to the mobile device as inputs that control an on-screen element. In the area of advertising, motion controls have been used as well. See, for example, U.S. Patent Application Pub. No. 2015/0186944, the entire contents of which is incorporated herein by reference. More recent remote controllers for video game console systems also have incorporated accelerometers such that motion imparted to the controller is translated to a corresponding virtual action displayed on-screen.

Other video game console systems, such as Microsoft's Kinect, have incorporated motion sensing input devices based on gesture recognition, with no physical contact between the player and the device.

Because motion is one of the most native forms of interaction between human beings and tangible objects, it would be desirable to utilize such inputs to the mobile device for interactions between a user and a three-dimensional virtual environment.

BRIEF SUMMARY

The present disclosure contemplates various methods and devices for producing a gesture-controlled augmented reality experience. In accordance with one embodiment, there is a method for producing a gesture-controlled augmented reality experience using a first mobile communications device. The method includes receiving a motion sensor input on a motion sensor input modality of the first mobile communications device, calculating a trajectory of a camera of the first mobile communications device in response to the received motion sensor input, receiving a visual input captured by the camera of the first mobile communications device, translating a gesture of a user into a set of quantified values based on the received visual input and the calculated trajectory of the camera, and controlling an augmented reality object within a three-dimensional virtual environment in response to a substantial match between the set of quantified values and a set of predefined values.

The method may include displaying the augmented reality object on the first mobile communications device, which may include displaying a movable-window view of the three-dimensional virtual environment on the first mobile communications device.

The method may include outputting, on the first mobile communications device, at least one of visual, auditory, and haptic feedback in response to a substantial match between the set of quantified values and a set of predefined values.

The method may include receiving an auditory input captured by a microphone of the first mobile communications device, and the step of controlling may include controlling the augmented reality object within the three-dimensional virtual environment in response to the received auditory input. The method may further include detecting a signature of music in response to the received auditory input, and the step of controlling may include controlling the augmented reality object within the three-dimensional virtual environment in response to the detected signature.

The method may include transmitting object control data to a second mobile communications device held by the user and communicatively coupled to the first mobile communications device, the object control data defining one or more movements of the augmented reality object within the three-dimensional virtual environment in response to said controlling. The method may include receiving a set of secondary quantified values from the second mobile communications device, and the step of controlling may include controlling the augmented reality object within the three-dimensional virtual environment in response to a substantial match between the set of secondary quantified values and the set of predefined values. The set of secondary quantified values may be derived from a motion sensor input on a motion sensor input modality of the second mobile communications device, a visual input captured by a camera of the second mobile communications device, and/or an auditory input captured by a microphone of the second mobile communications device.

The method may include transmitting feedback data to a second mobile communications device held by the user and communicatively coupled to the first mobile communications device, the feedback data defining at least one of visual, auditory, and haptic feedback to be output by the second mobile communications device in response to a substantial match between the set of quantified values and a set of predefined values.

The motion sensor input modality of the first mobile communications device may include at least one of an accelerometer, a gyroscope, and a magnetometer integrated into the first mobile communications device.

In accordance with another embodiment, there is a system including a non-transitory program storage medium readable by a first mobile communications device, the medium tangibly embodying one or more programs of instructions executable by the device to perform operations for producing a gesture-controlled augmented reality experience. The operations include receiving a motion sensor input on a motion sensor input modality of the first mobile communications device, calculating a trajectory of a camera of the first mobile communications device in response to the received motion sensor input, receiving a visual input captured by the camera of the first mobile communications device, translating a gesture of a user into a set of quantified values based on the received visual input and the calculated trajectory of the camera, and controlling an augmented reality object within a three-dimensional virtual environment in response to a substantial match between the set of quantified values and a set of predefined values.

The system may include the first mobile communications device, and the first mobile communications device may include a processor or programmable circuitry for executing the one or more programs of instructions. The system may further include a second mobile communications device held by the user and communicatively coupled to the first mobile communications device, and the operations may further include transmitting object control data to the second mobile communications device, the object control data defining one or more movements of the augmented reality object within the three-dimensional virtual environment in response to said controlling. The second mobile communications device may transmit a set of secondary quantified values to the first mobile communications device, and the controlling operation may include controlling the augmented reality object within the three-dimensional virtual environment in response to a substantial match between the set of secondary quantified values and the set of predefined values. The second mobile communications device may derive the set of secondary quantified values from a motion sensor input on a motion sensor input modality of the second mobile communications device, a visual input captured by a camera of the second mobile communications device, and/or an auditory input captured by a microphone of the second mobile communications device.

In accordance with another embodiment, there is a mobile communications device operable to produce a gesture-controlled augmented reality experience. The mobile communications device includes a motion sensor for receiving a motion sensor input, a camera for capturing a visual input, and a processor for calculating a trajectory of the camera in response to the received motion sensor input, translating a gesture of a user into a set of quantified values based on the received visual input and the calculated trajectory of the camera, and controlling an augmented reality object within a three-dimensional virtual environment in response to a substantial match between the set of quantified values and a set of predefined values.

The mobile communications device may include a display, and the processor may control the display to display the augmented reality object within a movable-window view of the three-dimensional virtual environment.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 4A and 4B relate to another example of a gesture-controlled augmented reality experience produced according to the method of FIG. 2, of which FIG. 4A shows the display of an augmented reality object on the mobile communications device 10 while the hands of the person in the scene are close together and FIG. 4B shows the display while the hands of the person in the scene are far apart;

FIGS. 5A-5F show additional aspects related to the example of FIGS. 4A and 4B, of which FIG. 5A shows the user moving one hand around the scene to trace a path, FIG. 5B shows the user holding two hands out with cupped palms facing upward, FIG. 5C shows the user holding two hands out with cupped palms facing upward and more inward than in FIG. 5B, FIG. 5D shows the user holding a single hand out palm up, FIG. 5E shows the user holding both hands out palms up, and FIG. 5F shows the user making a grabbing motion;

FIGS. 8A-8C relate to an example of a gesture-controlled augmented reality experience produced according to the method of FIG. 6 and the complementary method of FIG. 7, of which FIG. 8A shows the display of an augmented reality object on the mobile communications device 10A, FIG. 8B shows the person in the scene viewing a display of the augmented reality object on the additional mobile communications device 10B, and FIG. 8C shows the person in the scene shaking the additional mobile communications device 10B.

DETAILED DESCRIPTION

The present disclosure encompasses various embodiments of methods and devices for producing a gesture-controlled augmented reality experience. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
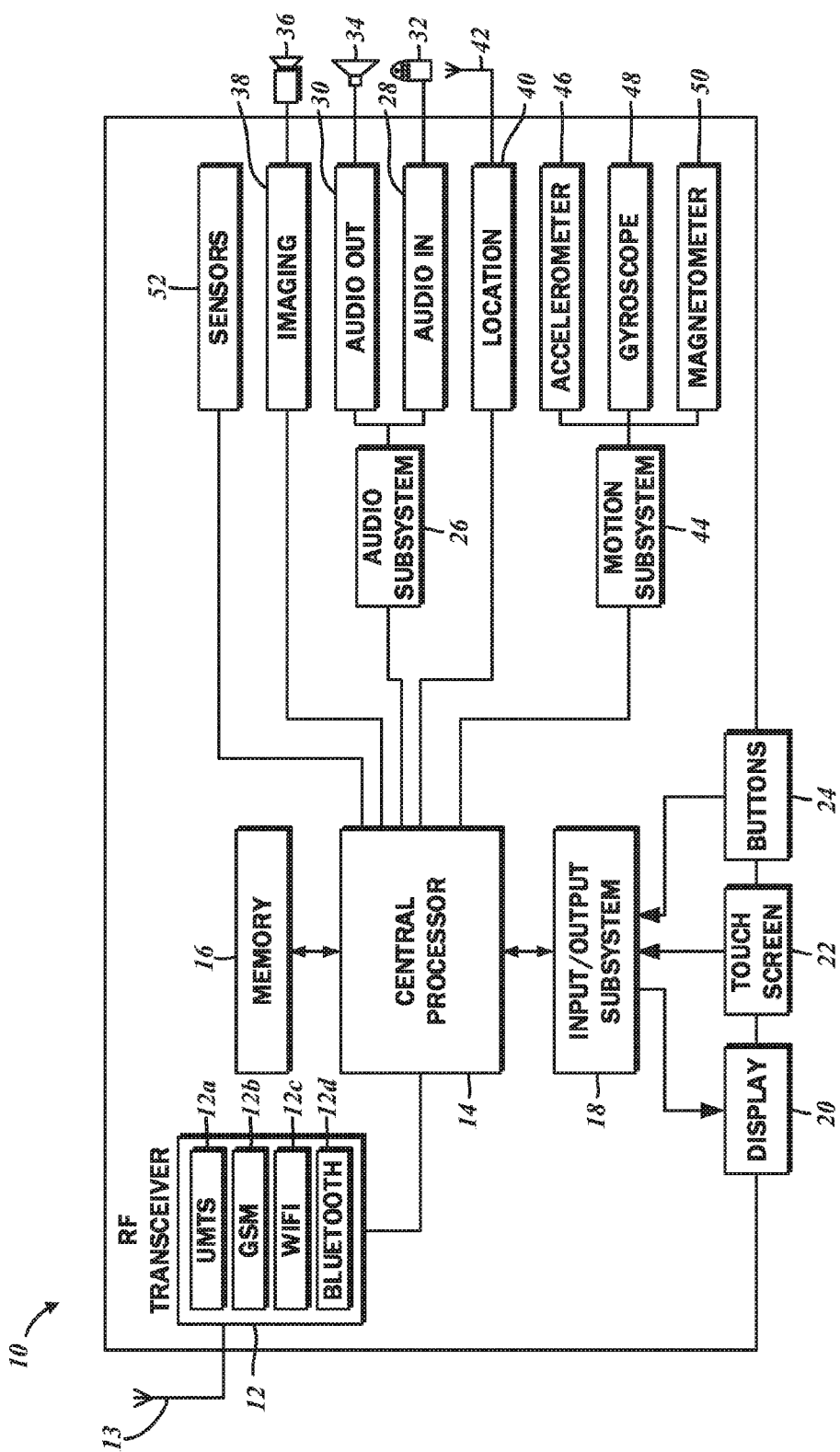
FIG. 1 illustrates one exemplary mobile communications device 10 on which various embodiments of the present disclosure may be implemented.

FIG. 1 illustrates one exemplary mobile communications device 10 on which various embodiments of the present disclosure may be implemented. The mobile communications device 10 may be a smartphone, and therefore include a radio frequency (RF) transceiver 12 that transmits and receives signals via an antenna 13. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12b. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12c and a Bluetooth module 12d. The enumeration of various wireless networking modules is not intended to be limiting, and others may be included without departing from the scope of the present disclosure.

The mobile communications device 10 is understood to implement a wide range of functionality through different software applications, which are colloquially known as "apps" in the mobile device context. The software applications are comprised of pre-programmed instructions that are executed by a central processor 14 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile communications device 10. Additionally, there may be other buttons and switches for controlling volume, limiting haptic entry, and so forth. Those having ordinary skill in the art will recognize other possible input/output devices that could be integrated into the mobile communications device 10, and the purposes such devices would serve. Other smartphone devices may include keyboards (not shown) and other mechanical input devices, and the presently disclosed interaction methods detailed more fully below are understood to be applicable to such alternative input modalities.

The mobile communications device 10 includes several other peripheral devices. One of the more basic is an audio subsystem 26 with an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. Furthermore, it is possible to capture still images and video via a camera 36 that is managed by an imaging module 38.

Due to its inherent mobility, users can access information and interact with the mobile communications device 10 practically anywhere. Additional context in this regard is discernible from inputs pertaining to location, movement, and physical and geographical orientation, which further enhance the user experience. Accordingly, the mobile communications device 10 includes a location module 40, which may be a Global Positioning System (GPS) receiver that is connected to a separate antenna 42 and generates coordinates data of the current location as extrapolated from signals received from the network of GPS satellites. Motions imparted upon the mobile communications device 10, as well as the physical and geographical orientation of the same, may be captured as data with a motion subsystem 44, in particular, with an accelerometer 46, a gyroscope 48, and a magnetometer 50, respectively. Although in some embodiments the accelerometer 46, the gyroscope 48, and the magnetometer 50 directly communicate with the central processor 14, more recent variations of the mobile communications device 10 utilize the motion subsystem 44 that is embodied as a separate co-processor to which the acceleration and orientation processing is offloaded for greater efficiency and reduced electrical power consumption. In either case, the outputs of the accelerometer 46, the gyroscope 48, and the magnetometer 50 may be combined in various ways to produce "soft" sensor output, such as a pedometer reading, or to function collectively as an inertial measurement unit (IMU). One exemplary embodiment of the mobile communications device 10 is the Apple iPhone with the M7 motion co-processor.

The components of the motion subsystem 44, including the accelerometer 46, the gyroscope 48, and the magnetometer 50, may be integrated into the mobile communications device 10 or may be incorporated into a separate, external device. This external device may be wearable by the user and communicatively linked to the mobile communications device 10 over the aforementioned data link modalities. The same physical interactions contemplated with the mobile communications device 10 to invoke various functions as discussed in further detail below may be possible with such external wearable device.

There are other sensors 52 that can be utilized in the mobile communications device 10 for different purposes. For example, one of the other sensors 52 may be a proximity sensor to detect the presence or absence of the user to invoke certain functions, while another may be a light sensor that adjusts the brightness of the display 20 according to ambient light conditions. Those having ordinary skill in the art will recognize that other sensors 52 beyond those considered herein are also possible.

With reference to the flowchart of FIG. 2, one embodiment of a method for producing a gesture-controlled augmented reality experience using the mobile communications device 10 will be described. None of the steps of the method disclosed herein should be deemed to require sequential execution. The method begins with a step 200 of receiving a motion sensor input on a motion sensor input modality of the mobile communications device 10. The motion sensor input modality may include at least one of the accelerometer 46, the magnetometer 50, and the gyroscope 48 and may further include the motion subsystem 44. As the mobile communications device 10 moves, either by a deliberate motion of a person holding it or by an inadvertent motion of a substantially stationary person attempting to hold the mobile communications device 10 steady, the camera 36 of the mobile communications device 10 moves together with the mobile communications device 10 according to some trajectory of motion. In a step 202, this trajectory of the camera 36 may be calculated in response to the received motion sensor input. For example, a combination of the accelerometer 46, magnetometer 50, and gyroscope 48 may function as an inertial measurement unit (IMU) to measure the position, velocity, or acceleration of the camera 36, e.g. a lens of the camera 36, relative to a relevant reference frame. The relevant reference frame may be, for example, a world reference frame in which the earth is considered stationary or a vehicle reference frame in which a steadily moving airplane or other vehicle is considered stationary.

Simultaneously, or otherwise correspondingly with the receipt of the motion sensor input, a visual input captured by the camera 36 is received in a step 204. The visual input may include image data (e.g. one or more still images or video feed) of a scene in which a user makes a gesture such as a motion or attitude/arrangement of the user's face, hand(s), leg(s), or body. The user may be a different person from the person holding the mobile communications device 10 and may, for example, be several meters away from the mobile communications device 10. As the user makes one or more gestures, the method proceeds with a step 206 of translating a gesture into a set of quantified values based on the received visual input and the calculated trajectory of the camera 36. Because the trajectory of the camera 36 is calculated, the user's gesture can be accurately observed irrespective of the motion of the camera 36. In this way, the camera 36 and inertial measurement unit (IMU) or motion sensor input modalities thereof may constitute a sensor fusion for accurately discerning the user's gesture. As a simple example, a vector representing the trajectory of the camera 36 may be subtracted from a vector representing a trajectory of a landmark in the received visual input in order to cancel the motion of the camera 36 and construct a plane of observation in the relevant reference frame. The landmark may be, for example, the user or a body party of the user such as the user's hand(s). Angles of observation in the constructed plane may then be measured using initial and terminal positions of the camera 36 and estimated distances to the landmark. Known vision algorithms, deep image processing, and/or machine learning may be used to recognize the landmark and/or movement patterns thereof constituting a gesture. In some cases, a person's body or body part may be preregistered as a landmark during a setup/calibration step in order to improve distance estimation and recognition accuracy.

In addition to the motion sensor input and visual input used to quantify the user's gesture, an auditory input captured by the microphone 32 of the mobile communications device 10 may also be received in a step 208. For example, the user or the person holding the mobile communications device 10 (if different) may issue voice commands, e.g. "START CAPTURE," "STOP CAPTURE," "START OVER AGAIN," etc. Auditory input may include music. In a case where the auditory input is music, a signature such as a tempo (e.g. beats per minute) melody, and other features/characteristics of the music may be detected in a step 210 by any known methods. See, e.g. Gainza, M. & Coyle, E. "Time Signature Detection by Using a Multi-Resolution Audio Similarity Matrix," 122nd Audio Engineering Society Convention, May 5-8, May 5-8, 2007, Vienna, Austria, the entire disclosure of which is hereby wholly incorporated by reference.

With the user's gesture having been translated into a set of quantified values, the method continues with a step 212 of controlling an augmented reality object within a three-dimensional virtual environment in response to a substantial match between the set of quantified values and a set of predefined values. The augmented reality object may be visually perceptible, e.g. a visual feature such as a drawn line or a virtual physical object. In such cases, the augmented reality object may be seen in a visual display of the three-dimensional virtual environment (e.g. using a rendering engine that supports a high poly-count of 3D assets with textures). Alternatively, or additionally, the augmented reality object may be an auditory effect emanating from a specific locality in virtual space and perceivable on a loudspeaker (such as the loudspeaker 34 of the mobile communications device 10), a haptic effect emanating from a specific locality in virtual space and perceivable on a haptic output device (such as the touch screen 22 or a vibration module of the mobile communications device 10), a localized command or instruction that provides a link to a website or other remote resource to a mobile communications device 10 entering its proximity in virtual space, or any other entity that can be defined in a three-dimensional virtual environment and perceivable by an application that can access the three-dimensional virtual environment.

Controlling the augmented reality object within the three-dimensional virtual environment may include, for example, placing the augmented reality object, removing the augmented reality object, moving the augmented reality object, or otherwise transforming the augmented reality object. As a simple example, a match between the quantified values translated from a user's gesture and a set of predefined values may simply result in selection of a particular augmented reality object and placement thereof. For example, in a case where the user's hand gestures are to be used to create augmented reality objects, a database of augmented reality objects may be stored in association with sets of predefined values (e.g. gesture recognition descriptors) of hand positions. When a set of quantified values translated from a user's actual hand position matches a set of predefined values in the database, the associated augmented reality object is selected and placed in the three-dimensional virtual environment anchored to the user's hand. Thus, for example, the user may hold up his hand with palm outward facing forward and a virtual stop sign may be selected and placed in the three-dimensional virtual environment at the position of the user's palm, to be viewed on the display of the mobile communications device 10 or other device that can view the virtual space. In this way, controlling the augmented reality object based on the user's gesture may include selecting and positioning the object.

As a more complicated example, the set of predefined values may be indicative not only of a particular augmented reality object, but also of parameters associated with that object including its movement within the three-dimensional virtual environment. So, for example, a user may make a palm-down, moving hand gesture indicative of dribbling a basketball. As in the case of the virtual stop sign, a set of quantified values translated from the user's hand position may match a set of predefined values in a database, this time associated with a virtual basketball, resulting in selection and placement of the virtual basketball in the three-dimensional virtual environment anchored to the user's hand (e.g. underneath the user's hand). In this case, however, the set of quantified values is continually translated from a gesture defining the user's upward and downward motion of his hand, and these quantified values are matched to predefined values associated with a parameter of the virtual basketball such as bounce speed and/or bounce position. In this way, controlling the augmented reality object based on the user's gesture may further include, in addition to selecting and positioning the object, moving the object and determining various parameters of the object.

In some cases, the control of the augmented reality object in step 212 may additionally be based on received audio input as described above in relation to step 208, such as voice commands or music, and/or based on a detected signature of the music as described in relation to step 210. Thus, for example, an augmented reality object such as the virtual stop sign or virtual basketball may be removed upon receipt of an appropriate voice command. As another example, a bounce speed parameter of the virtual basketball may be set to match a detected tempo of music.

As explained above, the augmented reality object may be visually perceptible. The method may further include a step 214 of displaying the augmented reality object on the mobile communications device 10 and/or an external device local or remote to the mobile communications device 10. Displaying the augmented reality object may include displaying a movable-window view of the three-dimensional virtual environment on the mobile communications device 10. That is, a portion of the three-dimensional virtual environment may be displayed on the display 20 of the mobile communications device 10 and the user of the mobile communications device 10 may adjust which portion of the three-dimensional virtual environment is displayed by panning the mobile communications device 10 through space. Thus, the angular attitude of the mobile communications device 10, as measured, e.g. by the gyroscope 48, inertial measurement unit (IMU), or sensor fusion of IMU with camera 36, may be used to determine which portion of the three-dimensional virtual environment is being viewed, with the augmented reality object being visible within the three-dimensional virtual environment when the relevant portion of the three-dimensional virtual environment is displayed. A movable-window view may also be displayed on an external device worn on or near the user's eyes and communicatively linked with the mobile communications device 10 (e.g. viewing glasses or visor). As another example, displaying the augmented reality object in step 214 may include displaying a large-area view of the three-dimensional virtual environment on an external device such as a stationary display local to the user. A large-area view may be, for example, a bird's eye view or an angled view from a distance (e.g. a corner of a room), which may provide a useful perspective on the three-dimensional virtual environment in some contexts.

The method may further include a step 216 of outputting, on the mobile communications device 10, at least one of visual, auditory, and haptic feedback in response to a substantial match between the set of quantified values translated from the user's gesture and a set of predefined values. Such feedback may enhance the user's feeling of interaction with the three-dimensional virtual environment. For example, when the user successfully performs a gesture that matches with a set of predefined values and results in the control of an augmented reality object, an audible chime, bell, spoken words, or other sound from the loudspeaker 34 of the mobile communications device 10 may indicate the user's success. Thus, in some examples, the predefined values for outputting feedback and the predefined values for controlling an augmented reality object may be one and the same, and, in such cases, it may be regarded that the substantial match results both in the control of an augmented reality object and the outputting of feedback. In other cases, visual, auditory, or haptic feedback may include audio instructions aimed at correcting an unsuccessful gesture produced by the user. For example, the mobile communications device 10 may detect some movement of the user's hand but the movement may be indistinct and result in quantitative values that ambiguously match multiple sets of predefined values or match a designated set of predefined values associated with an "error" result. In this situation, the mobile communications device 10 may audibly instruct the user accordingly, e.g. "Please perform the gesture more slowly." In this case, the predefined values used for determining a substantial match for purposes of outputting visual, auditory, or haptic feedback may be different from those predefined values used for determining a substantial match for purposes of controlling an augmented reality object.

Figure 2:
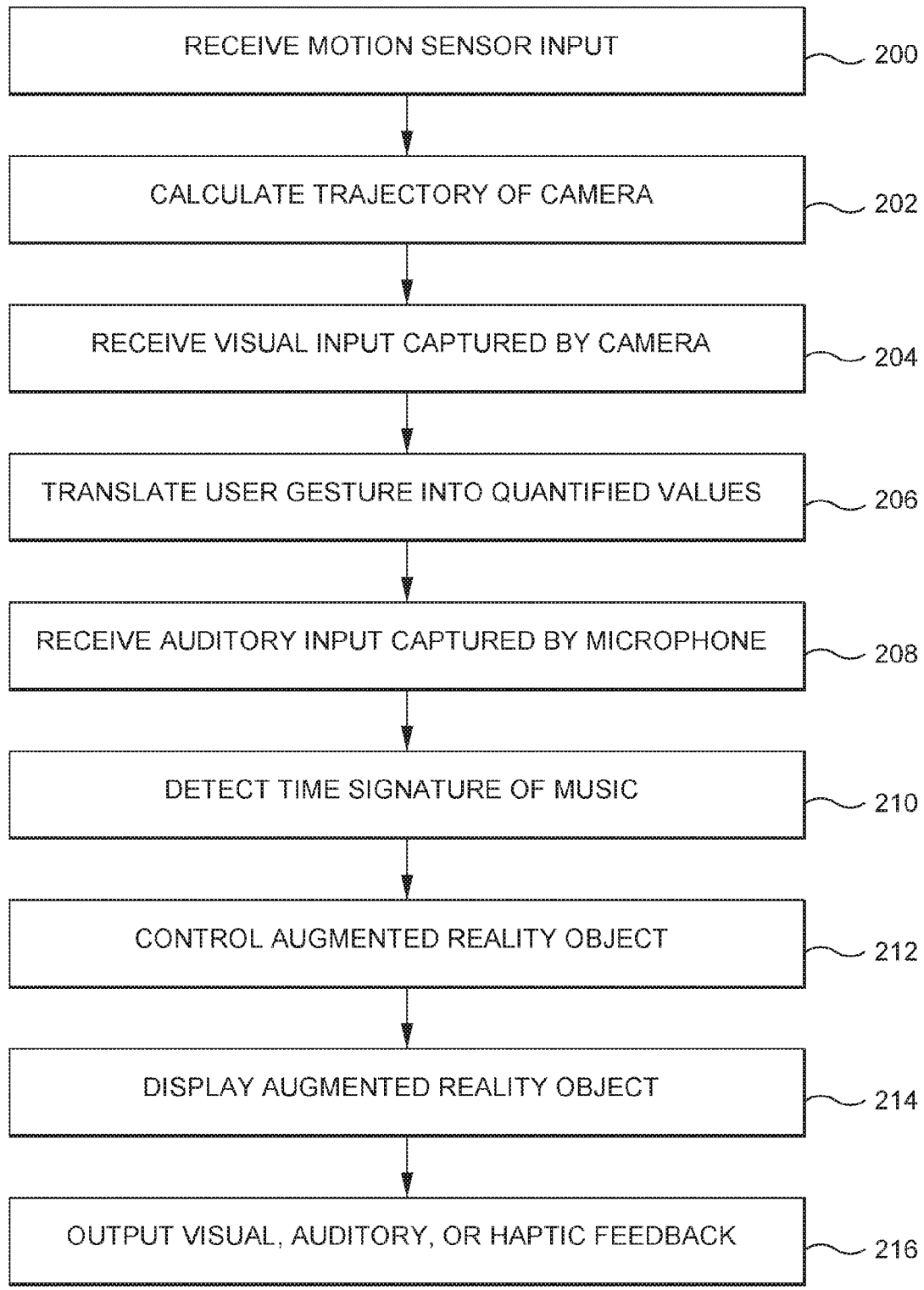
FIG. 2 illustrates one embodiment of a method for producing a gesture-controlled augmented reality experience using the mobile communications device 10.

Lastly, it should be noted that various additional steps may occur before, during, or after the method of FIG. 2. For example, instructions may be provided prompting the user as to what gesture to perform in order to generate an augmented reality object within a three-dimensional virtual environment. The instructions may, for example, be displayed as text and/or graphics on the display 20 of the mobile communications device 10 at startup of an application for producing a gesture-controlled augmented reality experience or at any other time, e.g. during loading or at a time that the application is ready to receive the visual input representing the user's gesture. With regard to such an application, it should be noted that additional preliminary steps may include, for example, displaying a content initialization screen, detecting software compatibility and/or hardware capability including onboard sensors (e.g. accelerometer 46, gyroscope 48, magnetometer 50, touch screen 22, microphone 32, camera 36), firing up sensors, optimizing sensor filters (e.g. sensor control switch, sensor fusion, sensor algorithm parameter optimization), initializing story elements of a three-dimensional virtual environment (e.g. placing initial augmented reality objects), and/or receiving an initial input on the mobile communications device 10 to trigger the activation of a gesture-controlled augmented reality experience. Activation of a gesture-controlled augmented reality experience may include, for example, initiating the collection and evaluation of the motion sensor input, visual input, auditory input, etc. using a control switch. Other examples of additional steps include designating roles for a user who will produce the gesture (e.g. "actor") and a person who will hold and operate the mobile communications device 10 (e.g. "controller"), providing role-specific instructions, calibration for gesture recognition (e.g. registering a user's body or body part(s) as landmarks), establishing third party connections to other mobile devices as described in more detail below, and computing analytics and/or storing relevant data from the user's experience, including the user's gestures, controlled augmented reality objects, etc., for later use such as sharing. Such processing and storing, as well as any processing and storing needed for performing the various steps of the method of FIG. 2 (e.g. storing predefined values), may be performed, e.g. by the central processor 14 and memory 16. It is also contemplated that a portion of the processing and storing needed for performing the various steps of the method of FIG. 2 may be performed remotely from the mobile communications device 10, such as on a cloud server.

Figure 3:
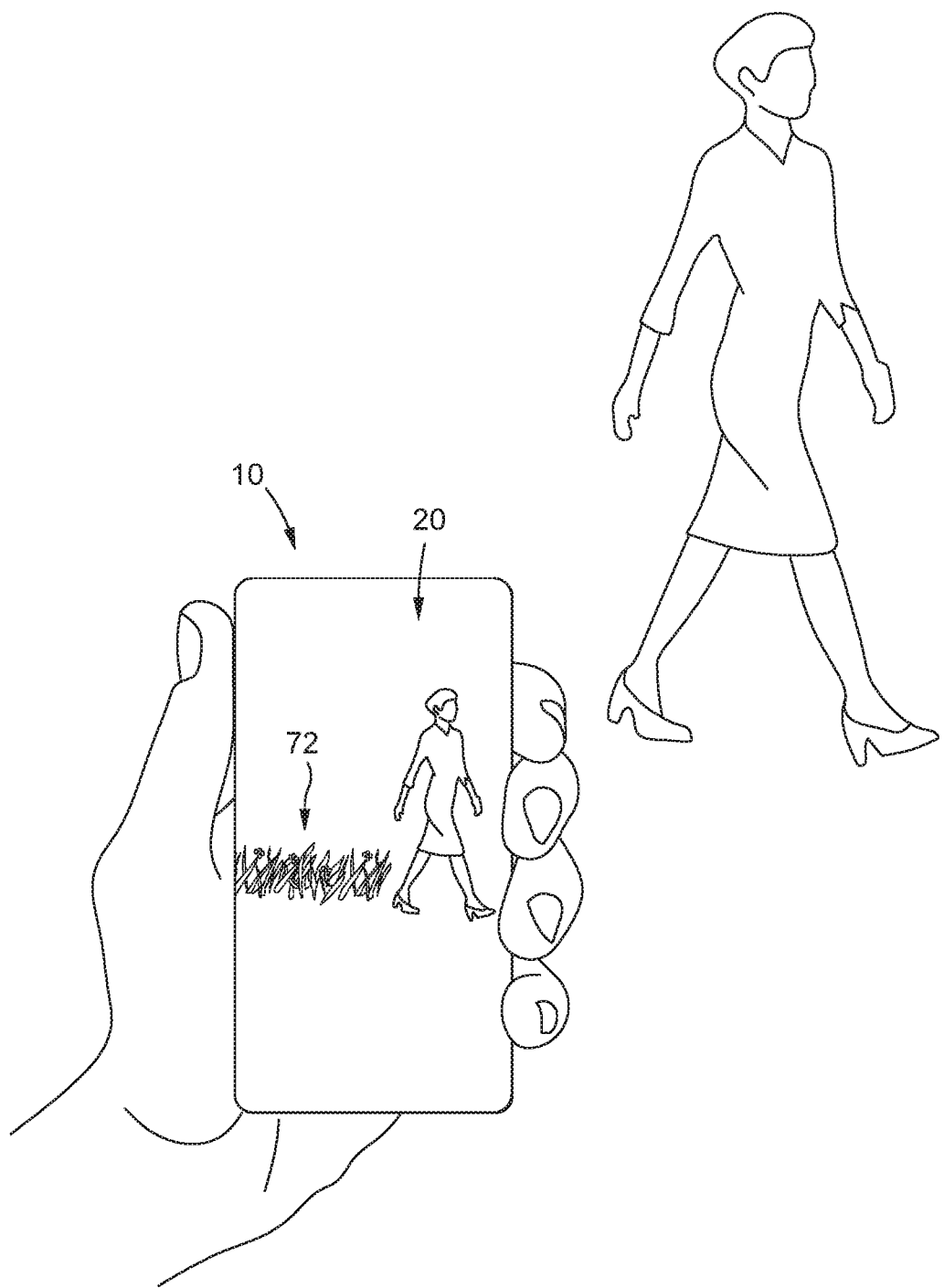
FIG. 3 shows an example of a gesture-controlled augmented reality experience produced according to the method of FIG. 2.

FIG. 3 shows an example of a gesture-controlled augmented reality experience produced according to the method of FIG. 2. A graphical user interface of an application running on the mobile communications device 10 includes primarily a live view image similar to that of a camera's live preview mode or digital viewfinder, i.e. the default still or video capture mode for most smart phones, in which a captured image is continuously displayed on the display 20 such that the real world may be viewed effectively by looking "through" the mobile communications device 10. In the example of FIG. 3, a walking person can be seen in the through image. In this example, the walking person is the user whose gestures will control the augmented reality experience produced in accordance with the method of FIG. 2. This user may also be referred to as having the "actor" role. In the example of FIG. 3, the person holding the mobile communications device 10 is a different person and may be referred to as having the "controller" role. The graphical user interface on the display 20 may additionally include text instructions for producing the augmented reality experience (e.g. "POINT CAMERA AT ACTOR"), which may overlay the through image on the graphical user interface such that the through image may be seen "behind" the instructions, or which may be displayed in a pop-up window or a dedicated top, bottom, or side panel area of the graphical user interface. In the case of an application for producing a gesture controlled augmented reality experience, such instructions may be displayed or not depending on design or user preference, e.g. every time the application runs, the first time the application runs, or never, relying on user knowledge of the application or external instructions. Non-display modes of instruction, e.g. audio instructions, are also contemplated.

As the person holding the mobile communications device 10 points the camera of the mobile communications device 10 at the user, the user's walking gesture is translated into quantified values by the mobile communications device 10 in accordance with steps 200, 202, 204, and 206 of FIG. 2. With the user's walking gesture thus quantified, a substantial match between the quantified values (e.g. values indicative of leg position in a world reference frame as a function of time) and predefined values (e.g. values such as gesture recognition descriptors stored in a database in association with augmented reality objects) results in placement of a virtual flower path 72 as an augmented reality object relative to a landmark (e.g. the user's legs) in a three-dimensional virtual environment. The matching between the quantified values and predefined values may further determine the values of parameters associated with the virtual flower path 72 (e.g. color, flower type, grass/flower height, growth speed, growth delay, etc.). As the user changes walking direction and speed, the virtual flower path 72 follows along in the three-dimensional virtual environment, growing where the user walked, perhaps after a brief delay set by the application and/or adjustable according to parameter values controlled by the user's walking gesture or other input (e.g. audio input). In this way, an augmented reality object, i.e. the virtual flower path 72, is controlled within a three-dimensional virtual environment in response to a substantial match between the set of quantified values translated from the user's gesture and a set of predefined values. The three-dimensional virtual environment including the augmented reality virtual flower path 72 may be displayed on the display 20 of the mobile communications device 10 according to a movable-window view as described above with the viewing angle, distance, etc. determined based on the motion sensor input and visual input (e.g. sensor fusion of IMU with camera 36).

In the example of FIG. 3, a substantial match between the quantified values and predefined values results in placement of a virtual flower path 72 as an augmented reality object and optionally determination of parameters associated with the virtual flower path 72. In addition, depending on the application, the substantial match between the quantified values and predefined values may also yield the selection of the virtual flower path 72 in the first place, for example, from among other potential augmented reality objects or more narrowly from among other similar path-style objects. Thus, a particular application might be limited to controlling only the virtual flower path 72, or limited to controlling path-style objects, or broadly capable of controlling many types of augmented reality objects. Such limitations may be fundamental limitations of the application or may be user-configured selected in a settings menu or at startup.

Figure 4A:
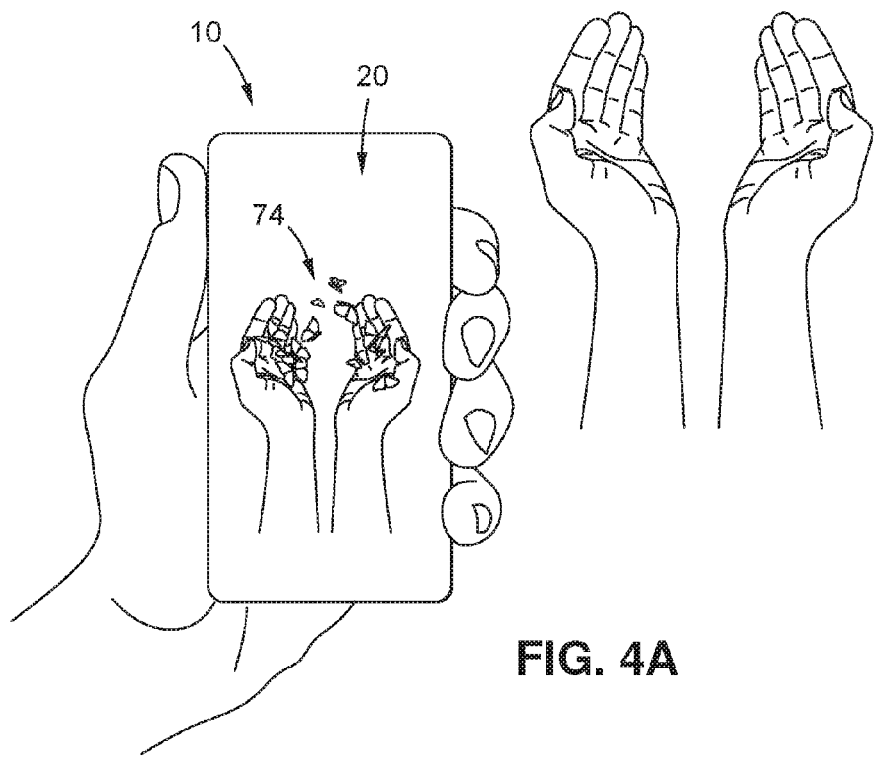
Figure 4B:
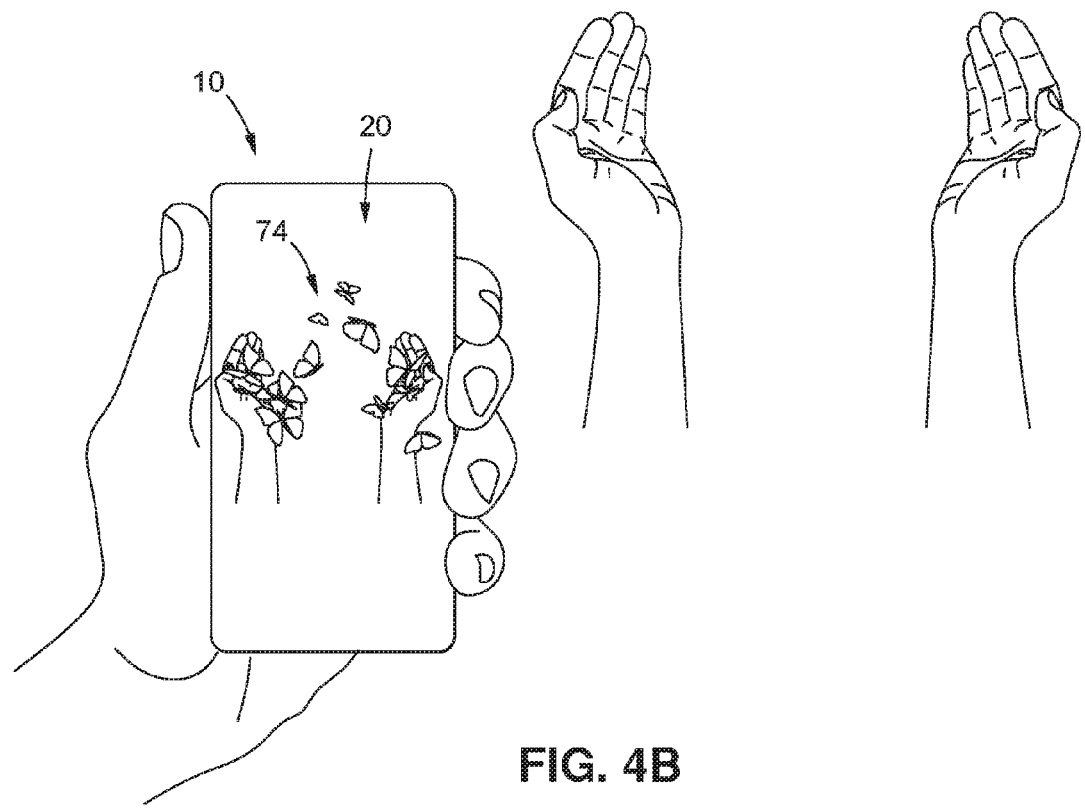

FIGS. 4A and 4B relate to another example of a gesture-controlled augmented reality experience produced according to the method of FIG. 2. As in the example of FIG. 3, a graphical user interface of an application running on the mobile communications device 10 includes a live view image in which a captured image is continuously displayed on the display 20. In the example of FIGS. 4A and 4B, a person's hands can be seen in the through image. In this example, the person whose hands can be seen in the through image is the user ("actor") whose gestures will control the augmented reality experience produced in accordance with the method of FIG. 2. The graphical user interface on the display 20 may additionally include text instructions for producing the augmented reality experience as described above, and non-display modes of instruction are also contemplated.

As the person holding the mobile communications device 10 points the camera of the mobile communications device 10 at the user, the user's hand gestures are translated into quantified values by the mobile communications device 10 in accordance with steps 200, 202, 204, and 206 of FIG. 2. With the user's hand gestures thus quantified, a substantial match between the quantified values (e.g. values indicative of hand position in a world reference frame as a function of time) and predefined values (e.g. values such as gesture recognition descriptors stored in a database in association with augmented reality objects) results in placement of virtual butterflies 74 relative to a landmark (e.g. the user's hands) in a three-dimensional virtual environment. A substantial match may further inform selection of the virtual butterflies 74 as the particular augmented reality object in the first place as described above in relation to the virtual flower path 72.

Similar to the case of the virtual flower path 72, the matching between the quantified values and predefined values may further determine the values of parameters associated with the virtual butterflies 74 (e.g. color, type, size, flight speed, flight pattern, flying/landed state, etc.). As the user performs predesignated gestures with his hands (as defined by predefined values associated with specific controls of the augmented reality object), the virtual butterflies 74 flutter around the three-dimensional virtual environment in response to the user's gestures. For example, as shown in FIGS. 4A and 4B, the inwardly cupped attitude of the user's hands may be translated into quantified values that determine the placement of the virtual butterflies 74, e.g. with the butterflies centered between the concave sides of the user's cupped hands and only occasionally flying outside the area between the user's hands or to the back of the user's hands. Meanwhile, the distance between the user's hands may be translated into quantified values that determine the size of the individual butterflies, which may be smaller as the user's hands are brought closer together as shown in FIG. 4A or larger as the user's hands are brought farther apart as shown in FIG. 4B. In this way, an augmented reality object, i.e. the virtual butterflies 74, may be controlled within a three-dimensional virtual environment in response to a substantial match between the set of quantified values translated from the user's gesture and a set of predefined values. The three-dimensional virtual environment including the augmented reality virtual butterflies 74 may be displayed on the display 20 of the mobile communications device 10 according to a movable-window view as described above with the viewing angle, distance, etc. determined based on the motion sensor input and visual input (e.g. sensor fusion of IMU with camera 36).

It should be noted that the virtual butterflies 74 may flutter around on their own within specific bounds or according to specific patterns (including random patterns) even without any change in the user's gesture or other input. That is, the augmented reality object itself may be a three-dimensional animation or set of three-dimensional features that move relative to each other according to the particular software code associated with that object, possibly with reference to default values of certain parameters (e.g. flight speed) that can also be set by the user's gestures. By the same token, the virtual flower path 72 of FIG. 3 may, for example, move as if to sway in the wind, irrespective of the user's walking motion.

Values of parameters associated with the virtual butterflies 74 may further be determined in accordance with other input besides the user's gestures, such as auditory input as described above. As an example, the pattern of motion of the virtual butterflies 74 may be determined in accordance with a music signature detected in step 210 of the method of FIG. 2, or the flight speed of the virtual butterflies 74 may be determined in accordance with a similarly determined music tempo. In this way, the virtual butterflies 74 may "dance" between the user's hands in response to music.

FIGS. 5A-5F show additional aspects related to the example of FIGS. 4A and 4B. Each of FIGS. 5A-5F shows the display 20 of a mobile communications device 10, on which a live view image of the user's hand gestures is visible together with the augmented reality virtual butterflies 74, e.g. according to a movable-window view of the three-dimensional virtual environment. Also visible in FIGS. 5A-5F are small dots indicative of features that have been found according to a machine vision algorithm for quantifying the user's gestures. The positions of these dots relative to a relevant reference frame (e.g. a world reference frame determined based on a sensor fusion of an IMU and the camera 36 of the mobile communications device 10) are an example of quantified values translated from the user's gestures.

Figure 5A:
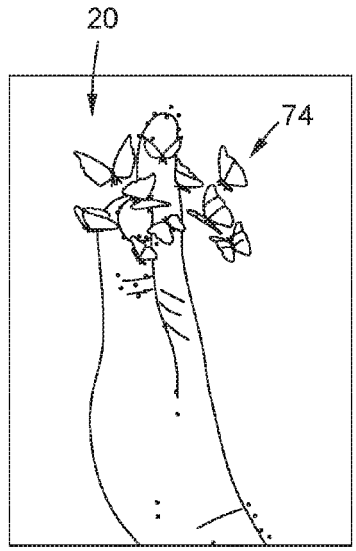
Figure 5B:
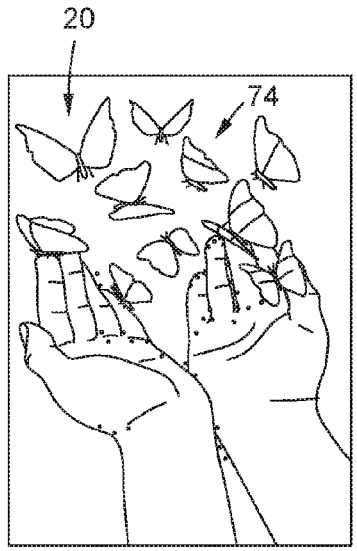
Figure 5C:
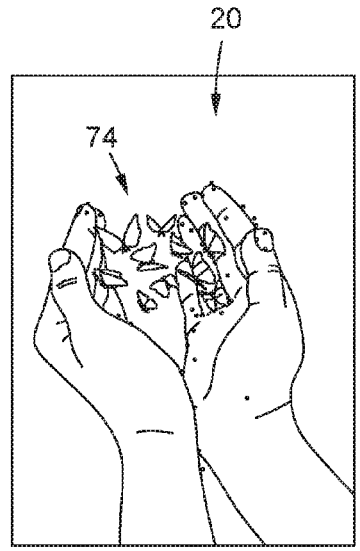
Figure 5D:
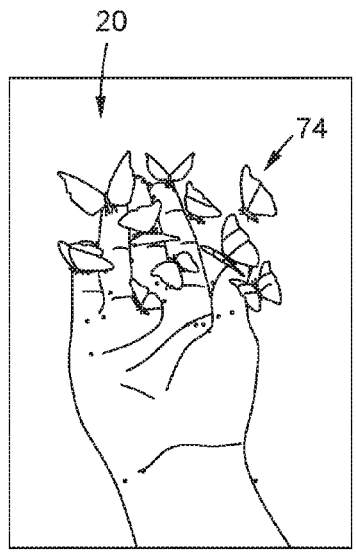
Figure 5E:
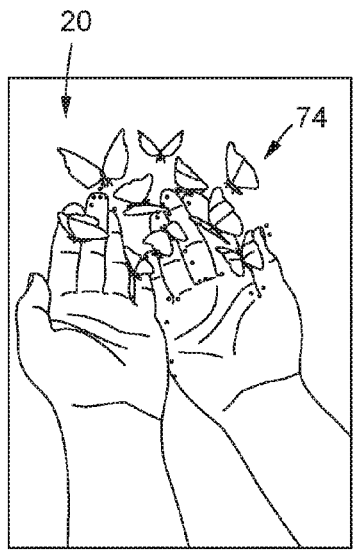
Figure 5F:
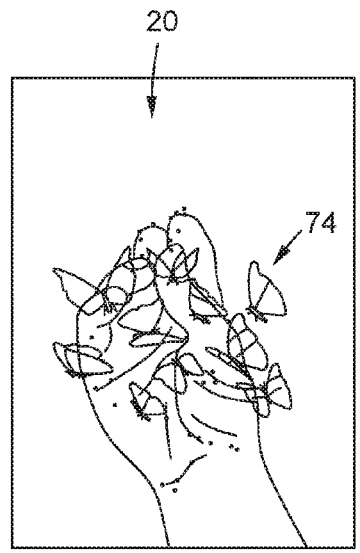

In FIG. 5A, the user is moving one hand around the scene to trace a path. The virtual butterflies 74 are controlled based on the user's gesture to follow the user's hand, e.g. anchored to the user's hand as a landmark by areal and/or landmark dot density. In FIGS. 5B and 5C, the user is holding two hands out with cupped palms facing upward, with the user's cupped palms facing more inward toward each other in FIG. 5C. The virtual butterflies 74 freely fly upward away from the user's palms in FIG. 5B while flying in a more confined area between the user's cupped hands in FIG. 5C. In FIG. 5C, the virtual butterflies 74 are also smaller than in FIG. 5B as the user's hands are closer together as described in relation to FIGS. 4A and 4B. In FIG. 5D, the user is holding a single hand out palm up. This gesture may, for example, summon a single butterfly from among the virtual butterflies 74 to alight on the user's hand. In FIG. 5E, the user is holding both hands out palms up. This gesture may, for example, summon a group of butterflies from among the virtual butterflies 74 to alight on the user's hands. In FIG. 5F, the user is making a grabbing motion. This gesture may, for example, allow the user to grab/enclose one or a cluster of the virtual butterflies 74 within a closed hand or between closed fingers. The grabbed butterfly or butterfly cluster may then be moved around the scene as the user moves his closed hand and may thereafter be released at a different position. The user may clap his hands to disperse the virtual butterflies 74, temporarily or in some cases signaling the end of the augmented reality experience and causing the virtual butterflies 74 to be removed.

Table 1 shows examples of single-handed gestures that may be implemented for controlling augmented reality objects, such as the virtual butterflies 74 described above, in accordance with embodiments of the present disclosure.

| Single-Handed Gesture | Augmented Reality Object Control |
| --- | --- |
| Cupped hand | Hold object (e.g. with virtual gravity implemented, the object may rest in the cupped hand) |
| Closing fist | Grasp/Select object |
| Hold open hand palm upward | Summon object |
| Hold open hand palm downward | Deselect object/Disengage hand (for double handed gestures) |
| Moving closed fist | Move selected object |
| Open hand motion upward | Deselect object and set to "action/interaction" mode (e.g. the object may continue its default motion) |
| Open hand motion downward | Deselect object and set to "disengaged" mode (e.g. the object may stop moving or be removed) |
| Dismissal (move open hand from side to other side once) | Deselect object in its most recent mode prior to selection |
| Throw (fist to open) | Deselect object and set to "action/interaction" mode (e.g. the object may continue its default motion) |

Table 2 shows examples of double-handed gestures that may be implemented for controlling augmented reality objects, such as the virtual butterflies 74 described above, in accordance with embodiments of the present disclosure.

| Double-Handed Gesture | Augmented Reality Object Control |
| --- | --- |
| Two open hands, palms upward | Select object for two-handed manipulation |
| One open hand, other hand "dismisses" | Deselect summoned object and summon a different one |
| Moving hands farther apart | Dilate selected object |
| Moving hands closer together | Contract selected object |
| Rotate hands clockwise or counterclockwise | Rotate selected object clockwise or counterclockwise |
| Clap open hands together | Duplicate object (e.g. generate one in each hand) |
| Close fist and stretch vertical or horizontal | Expand object either vertically or horizontally |
| One fist, one other single handed gesture [e.g. one fist, one "hold open hand palm upward"] | Hold onto selected object (in fist), apply appropriate action to secondary object for other hand [e.g. hold onto selected object (in fist), summon new object in open hand] |
| Raise both open hands, palms upward | Deselect any selected object and set all objects to "action/interaction" mode (e.g. the objects may continue their default motion) |
| Lower both hands, palms upward | Set all objects to "disengaged mode" (e.g. the objects may stop moving or be removed) |
| Open hand palm up, show 1-5 digits other hand | Set selected object to predefined mode enumerated 1-5 |
| Two handed throw | Set all selected objects to "action/interaction mode" (e.g. the objects may continue their default motion) |

With reference to the flowchart of FIG. 6, one embodiment of a method for producing a gesture-controlled augmented reality experience using a mobile communications device 10A in communication with an additional mobile communications device 10B will be described. None of the steps of the method disclosed herein should be deemed to require sequential execution. In the context of the method of FIG. 6, the mobile communications device 10 described in relation to FIG. 2 is given the reference number 10A and may be referred to as the first mobile communications device 10A (though the term "first mobile communications device" by itself is not intended to imply the existence of a second mobile communications device and may be used to describe a sole mobile communications device). Meanwhile, the previously described user who makes the gestures (i.e. the "actor") carries an additional mobile communications device 10B that may be substantially the same as the mobile communications device 10, 10A and may be referred to as the second mobile communications device 10B. The second mobile communications device 10B may serve various functions, including providing the user ("actor") with a visual display of the three-dimensional virtual environment including augmented reality objects, providing feedback, and collecting additional input from the user that will be used by the first mobile communications device 10A to control the augmented reality object.

The method begins with steps 600 through 610, which may be substantially the same as steps 200 through 210 of the method of FIG. 2. As noted above, various additional steps may occur before, during, or after the method of FIG. 2. Likewise, the same additional steps may occur before, during, or after the method of FIG. 6. Such steps may include, for example, establishing third party connections to other mobile devices as noted above. In the case of FIG. 6, establishing third party connections may include establishing a connection to communicatively couple the first mobile communications device 10A with the second mobile communications device 10B. In this regard, the connection may be direct or indirect, for example, via cellular or other wireless networks and may refer to mutual connection to a server. It should also be noted that, similar to the method of FIG. 6, any processing and storing needed for performing the various steps of the method of FIG. 6 (e.g. storing predefined values), may be performed, e.g. by the central processor 14 and memory 16. It is also contemplated that a portion of the processing and storing needed for performing the various steps of the method of FIG. 6 may be performed remotely from the mobile communications device 10, such as on a cloud server.

Figure 6:
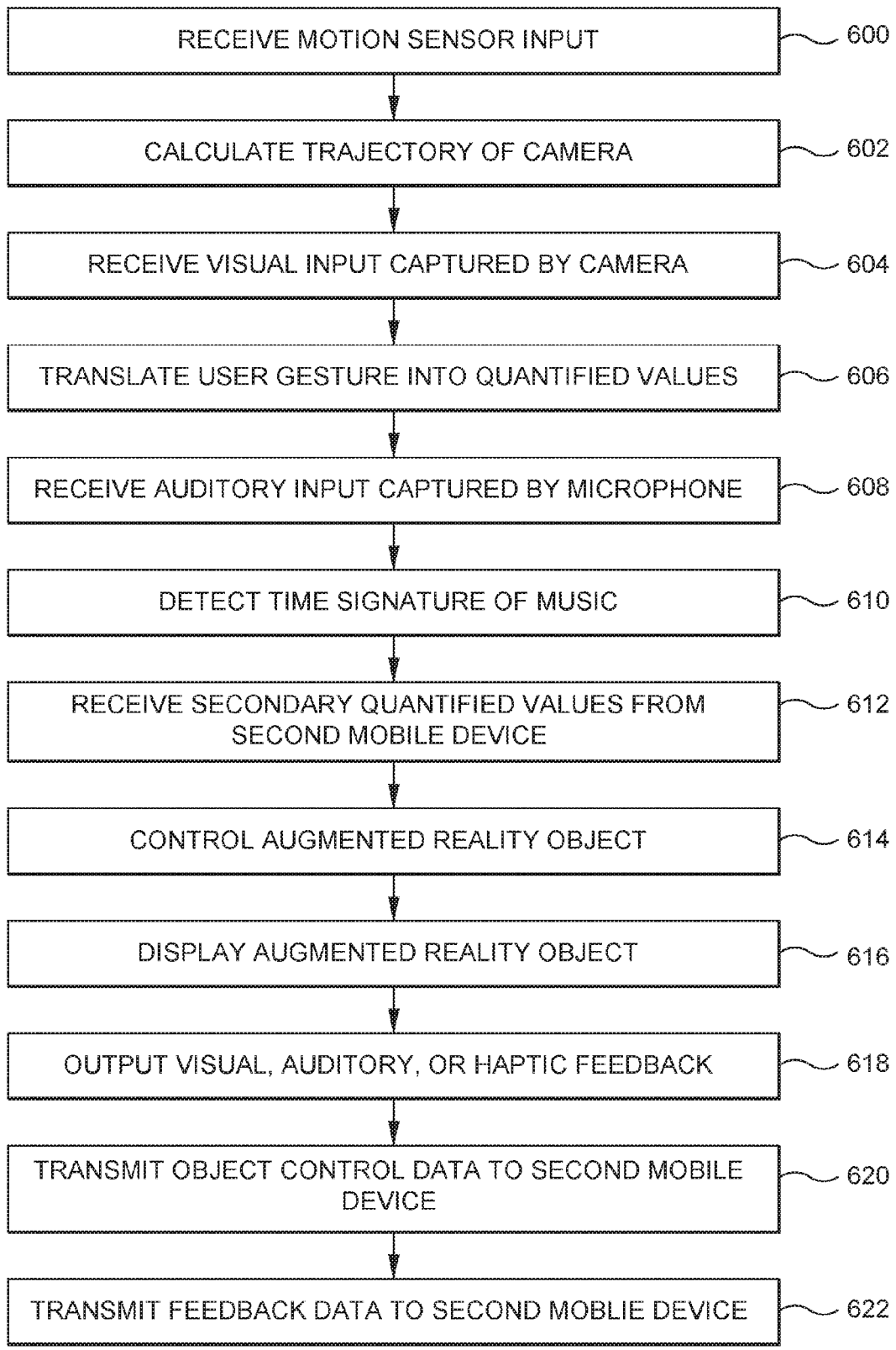
FIG. 6 illustrates one embodiment of a method for producing a gesture-controlled augmented reality experience using a mobile communications device 10A in communication with an additional mobile communications device 10B.

The method of FIG. 6 differs from the method of FIG. 2 in the receipt and transmission of information from and to the second mobile communications device 10B. In particular, the method includes a step 612 of receiving a set of secondary quantified values from the second mobile communications device 10B, in addition to the quantified values translated from the user's gesture in step 606. With the first mobile communications device 10A thus having received the set of secondary quantified values from the second mobile communications device 10B, the augmented reality object may be controlled by the first mobile communications device 10A at least in part based on the received secondary quantified values. That is, unlike corresponding step 212 of FIG. 2, step 614 of FIG. 6 may include controlling the augmented reality object in response to a substantial match between the set of secondary quantified values and the set of predefined values. In other respects, step 614 of FIG. 6. may be substantially the same as step 212 of FIG. 2.

The method of FIG. 6 continues with a step 616 of displaying the augmented reality object on the mobile communications device and/or an external device local or remote to the mobile communications device 10, which may be substantially the same as step 214 of FIG. 2, and a step 618 of outputting, on the mobile communications device 10, at least one of visual, auditory, and haptic feedback in response to a substantial match between the set of quantified values translated from the user's gesture and a set of predefined values, which may be substantially the same as step 216 of FIG. 2. However, in step 618, the output of feedback may further be based on a substantial match between the set of secondary quantified values received from the second mobile communications device 10B and the set of predefined values.

The method of FIG. 6 further differs from the method of FIG. 2 in the addition of a step 620 of transmitting object control data to the second mobile communications device 10B, the object control data defining one or more movements of the augmented reality object within the three-dimensional virtual environment in response to the control of the augmented reality object performed in step 614. The object control data may further define changes to the augmented reality object (including addition or removal thereof) that are not movements, such as modifications to various parameters of the augmented reality object as described throughout the present disclosure. The object control data may effectively inform the second mobile communications device 10B of any and all effects produced by the first mobile communications device 10A with respect to augmented reality objects in the three-dimensional virtual environment.

Lastly, the method of FIG. 6 further differs from the method of FIG. 2 in the addition of a step 622 of transmitting feedback data to the second mobile communications device 10B, the feedback data defining at least one of visual, auditory, and haptic feedback to be output by the second mobile communications device 10B in response to a substantial match between the set of quantified values and a set of predefined values. The feedback data may define the same or different feedback from that which is output by the first mobile communications device 10A in step 618. For example, the feedback output in step 618 may inform the person ("controller") holding the first mobile communications device 10A of something relevant to holding the first mobile communications device 10A (e.g. the camera 36 should be moved to better capture the "actor"), while the feedback to be output by the second mobile communications device 10B may provide instruction relevant to correctly performing a gesture.

With reference to the flowchart of FIG. 7, a complementary method to the method of FIG. 6, to be performed by the mobile communications device 10B, will be described. None of the steps of the method disclosed herein should be deemed to require sequential execution. First, in a step 700, the second mobile communications device 10B receives the object control data that was transmitted by the first mobile communications device 10A in step 620 of FIG. 6. In steps 702 and 704, the second mobile communications device 10B further receives a motion sensor input on a motion sensor input modality of the mobile communications device 10B and a visual input captured by the camera 36 of the mobile communications device 10B. Steps 702 and 704 may be substantially the same as steps 600 and 604 of FIG. 6, but with respect to the mobile communications device 10B rather than the mobile communications device 10A. However, rather than using the motion sensor input and visual input to translate a user gesture into quantified values as in step 606 of FIG. 6, the method of FIG. 7 takes advantage of the object control data received from the first mobile device 10A in step 700. Thus, it is not necessary to recognize the user's gesture, which has already been recognized by the first mobile device 10A and used to control the augmented reality object and generate the corresponding object control data. Instead, the method of FIG. 7 proceeds with displaying the augmented reality object on the second mobile device 10B (e.g. on a display 20 thereof) based on the object control data received from the mobile communications device 10A and one or both of the motion sensor input and visual input of the mobile communications device 10B received in steps 702 and 704. For example, to display a movable-window view of the three-dimensional virtual environment as described above, the angular attitude of the mobile communications device 10, as measured, e.g. by the gyroscope 48, inertial measurement unit (IMU), or sensor fusion of IMU with camera 36 in the form of motion sensor input and visual input, may be used to determine which portion of the three-dimensional virtual environment is being viewed, with the augmented reality object being visible within the three-dimensional virtual environment when the relevant portion of the three-dimensional virtual environment is displayed. As in the case of the first mobile communications device 10A, a movable-window view may also be displayed on an external device worn on or near the user's eyes and communicatively linked with the second mobile communications device 10B (e.g. viewing glasses or visor).

It should be noted that the motion sensor input and visual input received in steps 702 and 704 may, in principle, be used to recognize the user's gesture. However, as the user performing the gesture is holding the second mobile communications device 10B, the visibility of the gesture from the perspective of the camera 36 of the second mobile communications device 10B may be impaired and accuracy of gesture recognition may be improved through the use of spatially removed first mobile communications device 10A. Moreover, by using the first mobile communications device 10A that is not held by the user performing the gesture, the camera motion unrelated to the gesture can more easily be canceled as described above.

Figure 7:
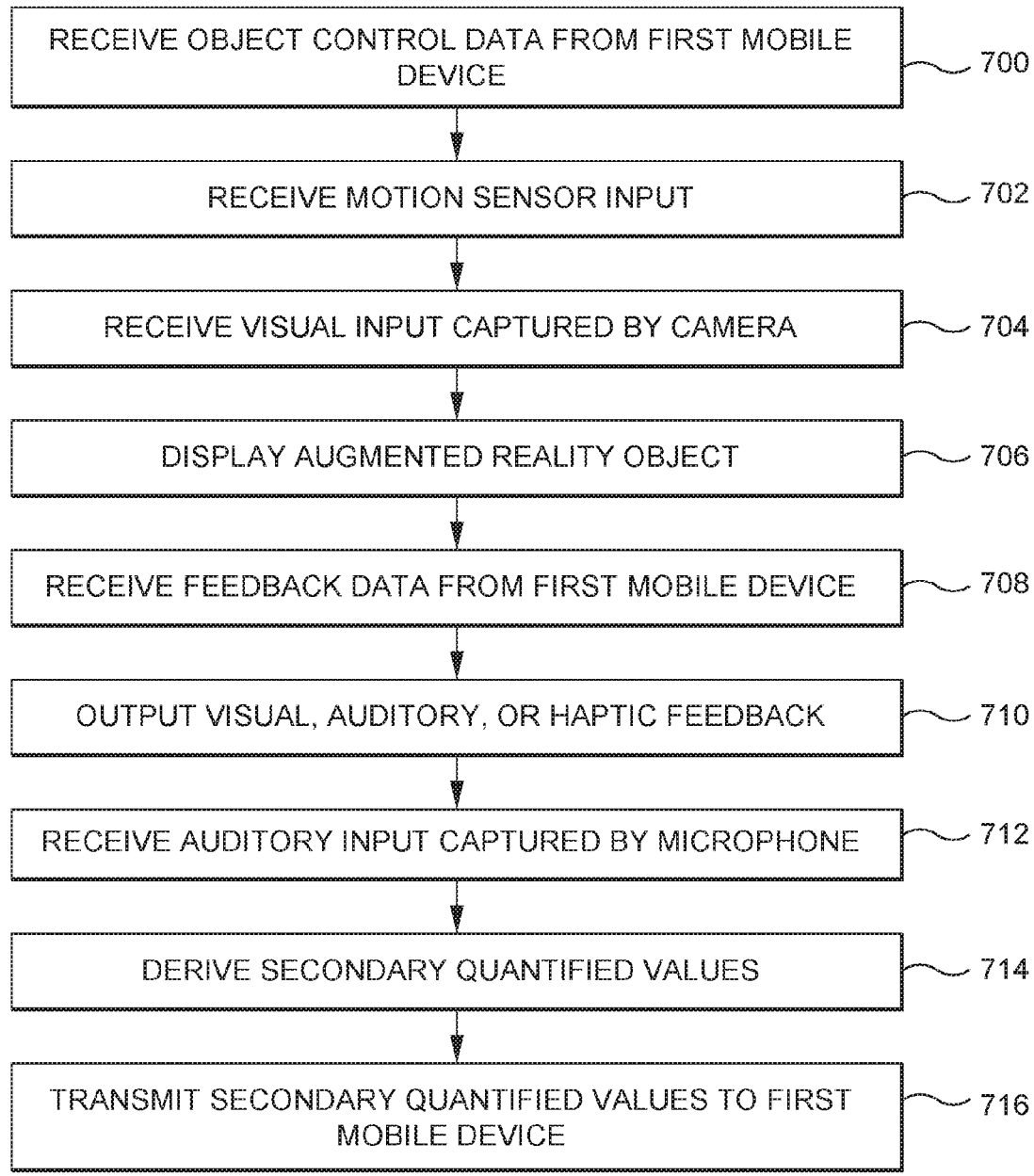
FIG. 7 illustrates a complementary method to the method of FIG. 6, to be performed by the mobile communications device 10B.

In a step 708, the method of FIG. 7 proceeds with the second mobile communications device 10B receiving the feedback data that was transmitted by the first mobile communications device 10A in step 622 of FIG. 6. The first mobile communications device 10B may output visual, auditory, or haptic feedback in accordance with the received feedback data in a step 710.

In a step 712, the method of FIG. 7 may further include receiving auditory input captured by the microphone 32 of the second mobile communications device 10B.

Having collected various data on input modalities of the mobile communications device 10B in steps 702, 704, and 712, namely data associated with the user who is performing the gestures (the "actor") and his/her immediate vicinity, the second mobile communications device 10B derives secondary quantified values from the collected data in a step 714 and transmits the secondary quantified values to the first mobile communications device 10A in a step 716 of the method. For example, the set of secondary quantified values may be derived from the motion sensor input on the motion sensor input modality of the second mobile communications device 10B, the visual input captured by the camera 36 of the second mobile communications device 10B, and/or the auditory input captured by the microphone 32 of the second mobile communications device 10B. The secondary quantified values transmitted by the second mobile communications device 10B in step 716 are received by the first mobile communications device 10A in step 612 of FIG. 6 and used by the first mobile communications device 10A to control the augmented reality object as described in relation to step 614. In this way, the first mobile communications device 10A may control the augmented reality object based not only on the user's gesture and other inputs as observed by the first mobile communications device 10A, but further based on various inputs (including those associated with the same gesture) as observed by the second mobile communications device 10B held by the user.

Figure 8A:
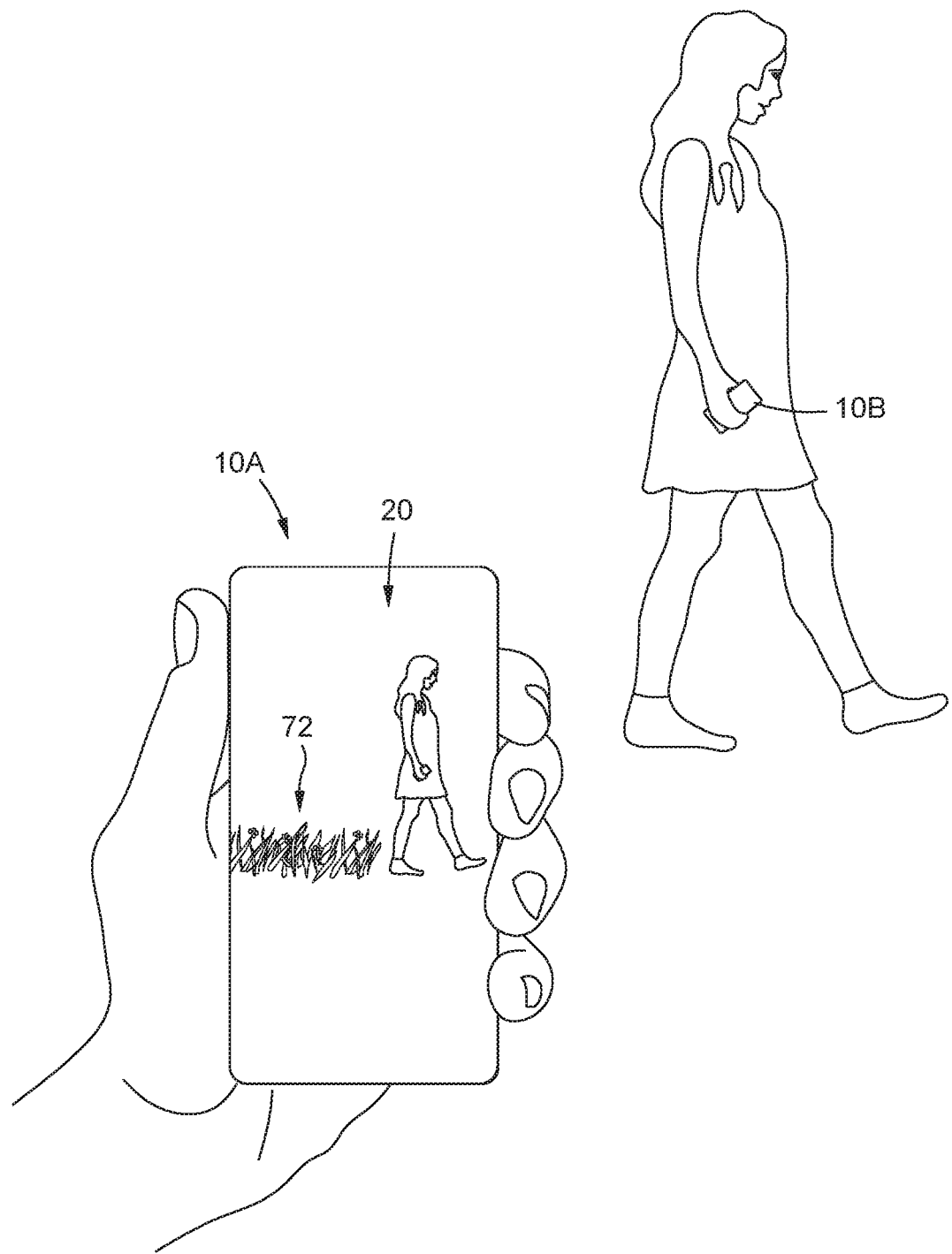
Figure 8B:
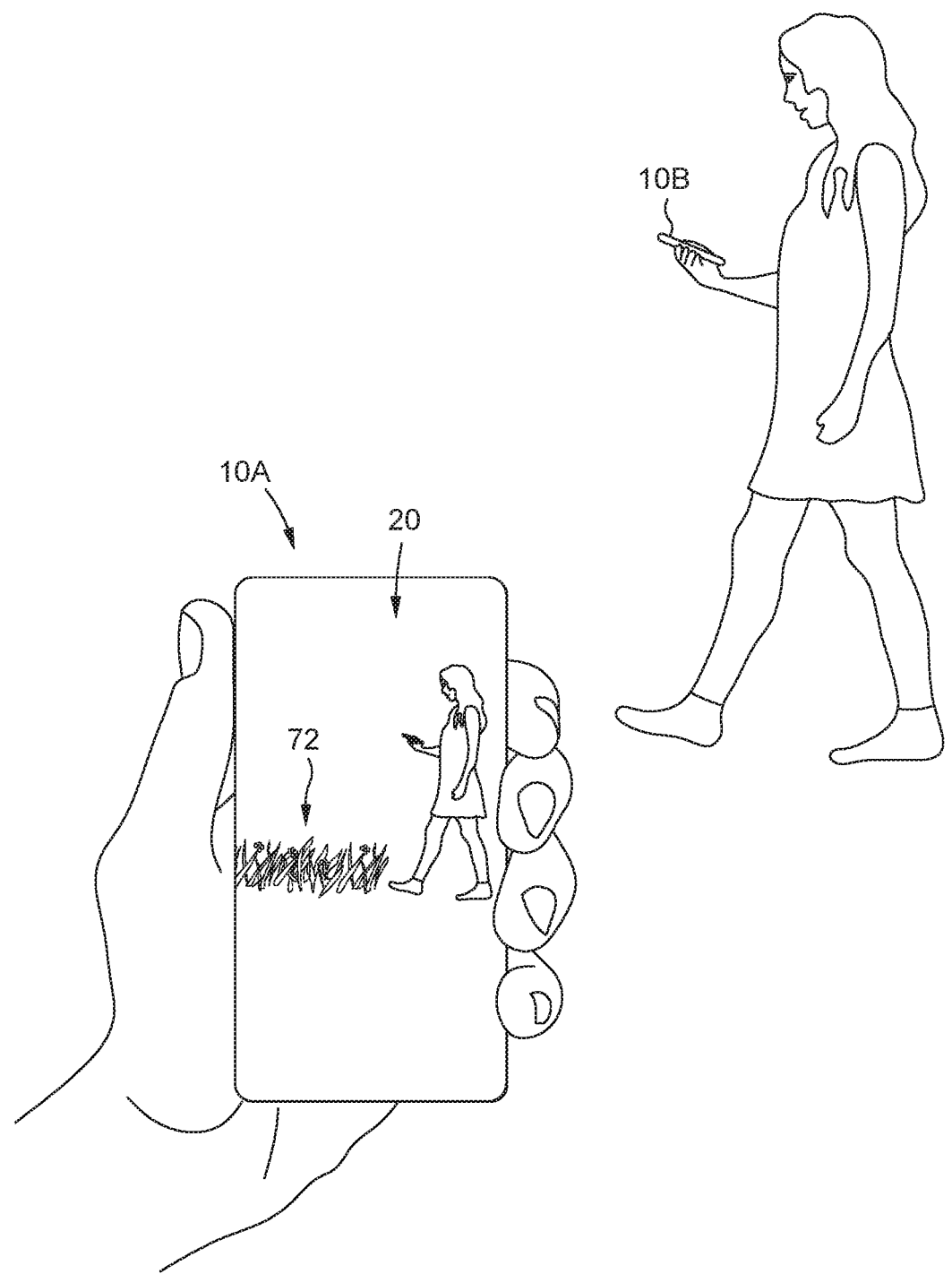
Figure 8C:
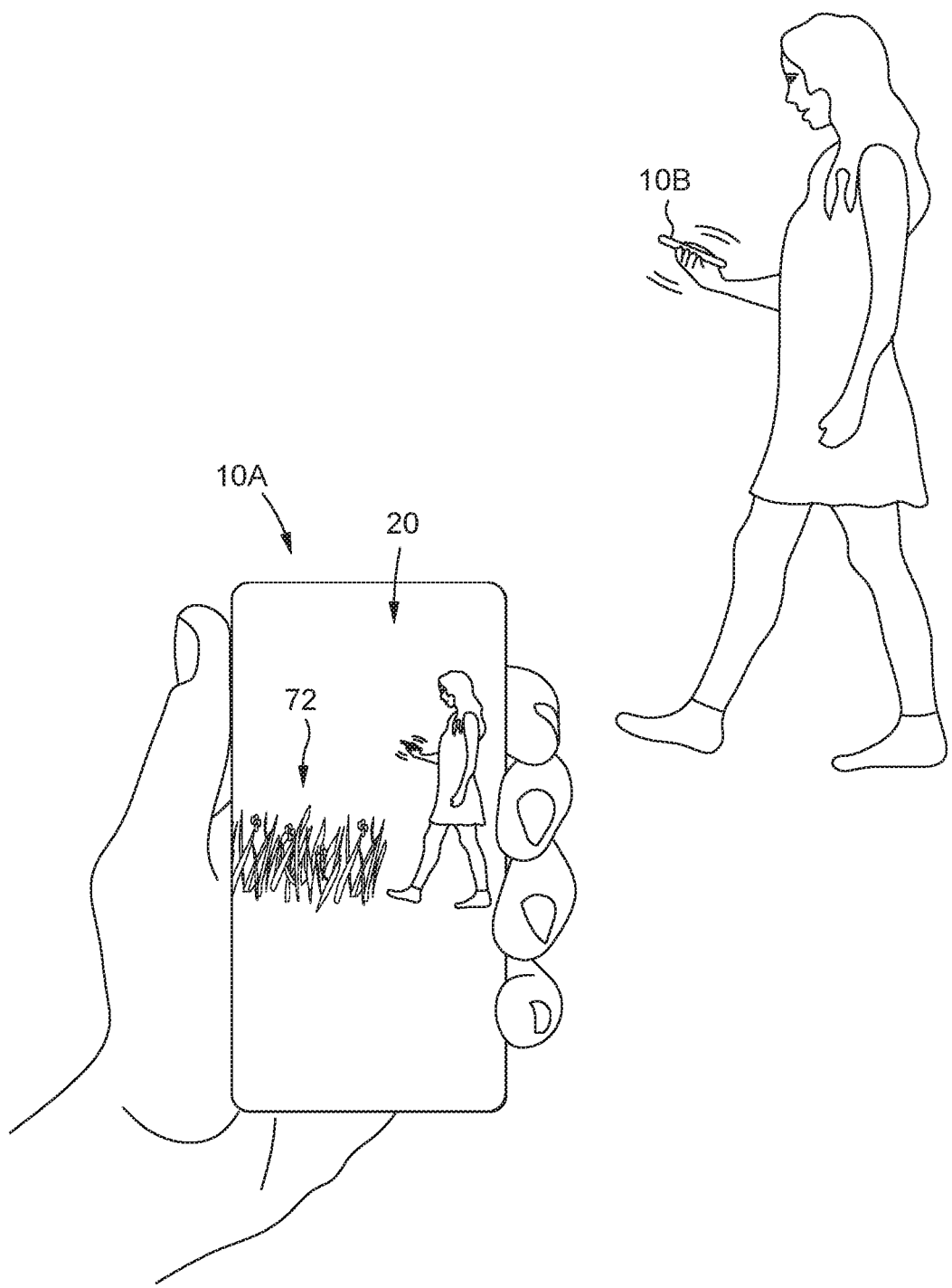

FIGS. 8A-8C relate to an example of a gesture-controlled augmented reality experience produced according to the method of FIG. 6 and the complementary method of FIG. 7. As in the example of FIG. 3, a graphical user interface of an application running on a mobile communications device includes a live view image in which a captured image is continuously displayed on the display 20. Note, however, that this mobile communications device is labeled 10A in the context of FIGS. 8A-8C and may be referred to as a first mobile communications device 10A in accordance with the methods of FIGS. 6 and 7. FIGS. 8A-8C further include a second mobile communications device 10B held by the user ("actor") whose gestures will control the augmented reality experience. The graphical user interface on the display 20 may additionally include text instructions for producing the augmented reality experience as described above, and non-display modes of instruction are also contemplated.

As the person holding the first mobile communications device 10A points the camera of the first mobile communications device 10A at the user, the user's walking gesture is translated into quantified values by the mobile communications device 10A in accordance with steps 600, 602, 604, and 606 of FIG. 6. With the user's walking gesture thus quantified, a substantial match between the quantified values (e.g. values indicative of leg position in a world reference frame as a function of time) and predefined values (e.g. values such as gesture recognition descriptors stored in a database in association with augmented reality objects) results in placement of a virtual flower path 72 as an augmented reality object relative to a landmark (e.g. the user's legs) in a three-dimensional virtual environment. As in the case of the above example of FIG. 3, the matching between the quantified values and predefined values may further determine the values of parameters associated with the virtual flower path 72 (e.g. color, flower type, grass/flower height, growth speed, growth delay, etc.). As the user changes walking direction and speed, the virtual flower path 72 follows along in the three-dimensional virtual environment, growing where the user walked, perhaps after a brief delay set by the application and/or adjustable according to parameter values controlled by the user's walking gesture or other input (e.g. audio input). In this way, just like in the example of FIG. 3, an augmented reality object, i.e. the virtual flower path 72, is controlled within a three-dimensional virtual environment in response to a substantial match between the set of quantified values translated from the user's gesture and a set of predefined values. Also, just like in the example of FIG. 3, the substantial match between the quantified values and predefined values may yield the selection of the virtual flower path 72 in the first place. The three-dimensional virtual environment including the augmented reality virtual flower path 72 may be displayed on the display 20 of the mobile communications device 10A according to a movable-window view as described above with the viewing angle, distance, etc. determined based on the motion sensor input and visual input (e.g. sensor fusion of IMU with camera 36).

The example of FIGS. 8A-8C differs from that of FIG. 3 in that the first mobile communications device 10A is communicatively coupled with the second mobile communications device 10B held by the user to allow for communication between the two devices in accordance with the methods of FIGS. 6 and 7. Thus, as the first mobile communications device 10A controls the virtual flower path 72 based on the user's gestures, the first mobile communications device 10A simultaneously transmits corresponding object control data to the second mobile communications device 10B in accordance with step 620 of FIG. 6. Upon receiving the transmitted object control data in step 700 of FIG. 7, the second mobile communications device 10B generates a display (step 706) of the same virtual flower path 72 as controlled by the first mobile communications device 10A, but visible from the perspective of the second mobile communications device 10B (as the display may also be based on a combination of motion sensor input and visual input received in steps 702 and 704). Thus, as shown in FIG. 8B, the user may turn around and view the virtual flower path 72 behind her using a movable-window view of the three-dimensional virtual environment displayed on the second mobile communications device 10B. In this way, as the user continues to take steps, the first mobile communications device 10A may control the continuing growth of the virtual flower path 72 based on the user's walking leg gestures (step 614), display the virtual flower path 72 from the perspective of the first mobile communications device 10A for the benefit of the controller (step 616), and transmit the object control data to the second mobile communications device 10B (step 620) so that the second mobile communications device 10B can display the virtual flower path 72 from the perspective of the second mobile communications device 10B for the benefit of the actor (step 706).

In FIG. 8C, the user begins to shake the mobile communications device 10B, causing the motion sensor input collected by the second mobile communications device 10B in step 702 to include data indicative of the shaking. Secondary quantified values derived from this motion sensor input in step 714 and transmitted to the first mobile communications device 10A in step 716 therefore include values indicative of the shaking. Upon receiving such secondary quantified values from the second mobile communications device 10B in step 612, the first mobile communications device 10A may then control the virtual flower path 72 based on such secondary quantified values in step 614. For example, the secondary quantified values may match a set of predefined values in a database associated with the values of one or more parameters of the augmented reality object, i.e. the virtual flower path 72. In this way, by shaking the mobile communications device 10B, the user can participate in the control of the virtual flower path 72. In the example of FIG. 8C, the shaking of the mobile communications device 10B causes the virtual flower path 72 to grow taller in the three-dimensional virtual environment. The user can immediately witness this effect as the first mobile communications device 10A transmits updated object control data to be received by the second mobile communications device 10B and the second mobile communications device 10B updates the display of the augmented reality object.

In the example of FIGS. 8A-8C, the virtual flower path 72 is controlled primarily by the user's walking gesture as recognized by the first mobile communications device 10A, with some additional control described based on the user shaking the second mobile communications device 10B.

However, it is also envisioned that the virtual flower path 72 may be controlled wholly or partly based on recognition of the user's walking motion by the motion sensor input modalities of the second mobile communications device 10B held by the walking user. In this regard, the embodiments of the present disclosure may be supplemented or otherwise combined with the techniques disclosed in co-owned U.S. Patent Application Pub. No. 2017/0269712, entitled "IMMERSIVE VIRTUAL EXPERIENCE USING A MOBILE COMMUNICATION DEVICE," the entire disclosure of which is hereby wholly incorporated by reference.

In the examples described above, a single mobile communications device 10 and a pair of mobile communications devices 10A, 10B are described. It is further contemplated that a network of mobile communications devices 10 including three or more mobile communications devices 10 may be communicatively coupled to control augmented reality objects in accordance with the embodiments of the present disclosure. In this way, multiple sensors, cameras, microphones, etc. in a variety of locations can be used to improve gesture recognition, implement additional sources of object control, and/or provide additional participation and collaboration. It is further contemplated that the one or more mobile communications devices 10 may be communicatively coupled with other computing devices, e.g. a desktop computer or server. For example, a desktop computer may wait as a session with an augmented reality object is recorded and thereafter provide playback or sharing features. Simultaneous streaming to a third-party device, e.g. a desktop computer, is also envisioned. In this way, processing and storage requirements of the mobile communications device(s) 10 may be reduced.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for producing a gesture-controlled augmented reality experience using a first mobile communications device, the method comprising:
   receiving a motion sensor input on a motion sensor input modality of the first mobile communications device from a user;
   calculating a trajectory of a camera of the first mobile communications device in response to the received motion sensor input;
   receiving one or more images of a person other than the user captured by the camera of the first mobile communications device;
   translating a gesture of the person other than the user into a set of quantified values based on the received one or more images and the calculated trajectory of the camera, the set of quantified values being calculated by a removal of the calculated trajectory from the received one or more images of the person other than the user; and
   controlling an augmented reality object within a three-dimensional virtual environment in response to a substantial match between the set of quantified values and a set of predefined values.

2. The method of claim 1, further comprising:
   displaying the augmented reality object on the first mobile communications device.

3. The method of claim 2, wherein said displaying the augmented reality object includes displaying a movable-window view of the three-dimensional virtual environment on the first mobile communications device.

4. The method of claim 1, further comprising:
   outputting, on the first mobile communications device, at least one of visual, auditory, and haptic feedback in response to a substantial match between the set of quantified values and a set of predefined values.

5. The method of claim 1, further comprising:
   receiving an auditory input captured by a microphone of the first mobile communications device;
   wherein said controlling includes controlling the augmented reality object within the three-dimensional virtual environment in response to the received auditory input.

6. The method of claim 5, further comprising:
   detecting a signature of music in response to the received auditory input;
   wherein said controlling includes controlling the augmented reality object within the three-dimensional virtual environment in response to the detected signature.

7. The method of claim 1, further comprising:
   transmitting object control data to a second mobile communications device held by the person other than the user and communicatively coupled to the first mobile communications device, the object control data defining one or more movements of the augmented reality object within the three-dimensional virtual environment in response to said controlling.

8. The method of claim 7, further comprising:
   receiving a set of secondary quantified values from the second mobile communications device;
   wherein said controlling includes controlling the augmented reality object within the three-dimensional virtual environment in response to a substantial match between the set of secondary quantified values and the set of predefined values.

9. The method of claim 8, wherein the set of secondary quantified values is derived from a motion sensor input on a motion sensor input modality of the second mobile communications device.

10. The method of claim 8, wherein the set of secondary quantified values is derived from a one or more images captured by a camera of the second mobile communications device.

11. The method of claim 8, wherein the set of secondary quantified values is derived from an auditory input captured by a microphone of the second mobile communications device.

12. The method of claim 1, further comprising:
   transmitting feedback data to a second mobile communications device held by the person other than the user and communicatively coupled to the first mobile communications device, the feedback data defining at least one of visual, auditory, and haptic feedback to be output by the second mobile communications device in response to a substantial match between the set of quantified values and a set of predefined values.

13. The method of claim 1, wherein the motion sensor input modality of the first mobile communications device includes at least one of an accelerometer, a gyroscope, and a magnetometer integrated into the first mobile communications device.

14. A system comprising a non-transitory program storage medium readable by a first mobile communications device, the medium tangibly embodying one or more programs of instructions executable by the device to perform operations for producing a gesture-controlled augmented reality experience, the operations comprising:
  receiving a motion sensor input on a motion sensor input modality of the first mobile communications device from a user;
  calculating a trajectory of a camera of the first mobile communications device in response to the received motion sensor input;
  receiving one or more images of a person other than the user captured by the camera of the first mobile communications device;
  translating a gesture of the person other than the user into a set of quantified values based on the received one or more images and the calculated trajectory of the camera, the set of quantified values being calculated by a removal of the calculated trajectory from the received one or more images of the person other than the user; and
  controlling an augmented reality object within a three-dimensional virtual environment in response to a substantial match between the set of quantified values and a set of predefined values.

15. The system of claim 14, further comprising:
  the first mobile communications device;
  wherein the first mobile communications device includes a processor or programmable circuitry for executing the one or more programs of instructions.

16. The system of claim 15, further comprising:
  a second mobile communications device held by the person other than the user and communicatively coupled to the first mobile communications device;
  wherein the operations further comprise transmitting object control data to the second mobile communications device, the object control data defining one or more movements of the augmented reality object within the three-dimensional virtual environment in response to said controlling.

17. The system of claim 16, wherein:
  the second mobile communications device transmits a set of secondary quantified values to the first mobile communications device; and
  said controlling includes controlling the augmented reality object within the three-dimensional virtual environment in response to a substantial match between the set of secondary quantified values and the set of predefined values.

18. The system of claim 17, wherein the second mobile communications device derives the set of secondary quantified values from a motion sensor input on a motion sensor input modality of the second mobile communications device, one or more images captured by a camera of the second mobile communications device, and/or an auditory input captured by a microphone of the second mobile communications device.

19. A mobile communications device operable to produce a gesture-controlled augmented reality experience, the mobile communications device comprising:
  a motion sensor for receiving a motion sensor input from a user;
  a camera for capturing a one or more images of a person other than the user; and
  a processor for calculating a trajectory of the camera in response to the received motion sensor input, translating a gesture of person other than the user into a set of quantified values based on the received one or more images and the calculated trajectory of the camera, the set of quantified values being calculated by a removal of the calculated trajectory from the received one or more images of the person other than the user, and controlling an augmented reality object within a three-dimensional virtual environment in response to a substantial match between the set of quantified values and a set of predefined values.

20. The mobile communications device of claim 19, further comprising:
  a display; wherein the processor controls the display to display the augmented reality object within a movable-window view of the three-dimensional virtual environment.

* * * * *